United States Patent Office 3,660,377
Patented May 2, 1972

3,660,377
PRODUCTION OF RESINS FROM
REDUCING SUGARS
Raoul Guillaume Philippe Walon, Brussels, Belgium, assignor to CPC International Inc.
No Drawing. Filed Oct. 10, 1969, Ser. No. 865,508
Int. Cl. C07c 95/04
U.S. Cl. 260—211 R 8 Claims

ABSTRACT OF THE DISCLOSURE

Covers a novel edible reducing sugar based resin having ion exchange capability. Also covers methods for producing said resin.

---

The invention deals with novel edible resins having ion exchange and molecule absorption capabilities. The resins are produced by reacting a nitrogen containing compound selected from the group consisting of ammonia, a bifunctional compound having both an acid function and a primary or secondary amine function, and mixtures thereof, with a reducing sugar dissolved in an aqueous medium.

Edible resins with ion exchange capabilities are used as carriers for antibiotics. When in their salt form, they may be used to reduce stomach acidity. New edible ion exchange resins are continually being sought. The production of a new edible ion exchange resin from a readily available low cost material would be highly desirable.

In view of the above, it is an object of this invention to produce new edible ion exchange resins.

A further object of the invention is to produce ion exchange resins which are edible and have significant ion exchange activity from reducing sugars.

A still further object of the invention is to inexpensively produce edible ion exchange resins suitable for use in pharmaceutical applications from reducing sugars.

Other objects will appear hereinafter in the description which follows and will be obvious from the scope of the appended claims.

GENERAL DESCRIPTION OF THE INVENTION

In the broadest sense, the invention comprises producing a novel resin by reacting a nitrogen containing compound selected from the group consisting of ammonia, a bifunctional compound having both an acid function and a primary or secondary amine function, and mixtures thereof, with a reducing sugar dissolved in an aqueous medium. A gummy reaction mass with ion exchange capability is obtained in this manner.

It is important to the practice of the invention that the ammonia or bifunctional compound is added to an aqueous reducing sugar solution over a sufficient period of time so that the pH of the solution does not become basic enough for carmelization of the reducing sugar to occur at the temperature employed in the reaction. Preferably, the pH of the solution is maintained below about 7, although somewhat more basic pH's can be tolerated for short periods of time.

For efficient production of the resins, it is preferred that the reacting of ammonia and/or the bifunctional compound with the dissolved reducing sugar occur at a temperature from about 80° C. to about 150° C.

It is also preferred that the reducing sugar solution is agitated during the addition of ammonia and/or the bifunctional compound.

Preferably, the reaction is carried out until the reducing sugar has polymerized to the point where a gummy reaction mass is formed and agitation of the solution becomes extremely difficult.

It is preferred that the reaction mass be dispersed in a liquid, separated from the liquid, and washed to obtain a purer edible product. Any liquid which will not react with the reaction mass may be used, although aqueous solutions are preferred due to the low cost and ready availability of water.

The dispersing may be accomplished by vigorous agitation, grinding, or the like.

The mass may be separated from the liquid by any convenient technique, for example, filtration, centrifugation, decantation, and the like, are applicable methods.

After the separated mass has been washed, it may either be stored in a wet state or it may be dried and then stored. It is, of course, also possible to immediately use the resin.

Examples of bifunctional compounds usable in the practice of the invention include protein hydrolyzates; polypeptides; peptides; alpha-amino acids such as glycine, alanine, crystine, phenylalanine, lysine, and tyrosine; amino sulfonic acids such as taurine; and the like. Preferred are alpha-amino (carboxylic) acids and amino sulfonic acids.

The reducing sugar solution may be formed by any convenient technique. For example, solid reducing sugar may be dissolved in water. Alternatively starch hydrolyzates which are relatively high in reducing sugar content, may be used. Greens or hydrol, which are the starch hydrolyzates obtained after at least one crop of dextrose has been crystallized out of a starch hydrolyzate solution, may also be used in the practice of the invention. Whatever the source of the reducing sugar solution, it is preferred, but not essential, that it have dissolved therein at least about 70% of dry substance by weight.

The reducing sugar preferably used, due to low cost and ready availability, is dextrose. Any reducing sugar, for example, dextrose, fructose, mannose, maltose, lactose, and mixtures thereof may, however, be used.

Suitable starches which may be used to produce starch hydrolyzate solutions for use in the practice of this invention, include cereal starches such as corn, rice, rye, grain sorghum, and wheat; waxy starches such as waxy milo and waxy maze; and root starches such as potato starch and tapioca starch. Crude starch sources may also be used such as ground cereals, macerated tubers, or partially purified starches therefrom.

The use of reducing sugar containing starch hydrolyzate solutions and hydrol is especially attractive since these materials are relatively inexpensive.

When ammonia and/or a bifunctional compound is added to the dextrose containing solution, it may be added either as a water solution or as a powder. Somewhat better yields are obtained when the ammonia and/or the bifunctional compound is introduced as part of a water solution. This is probably due to better contact between the reducing sugar and the added ammonia and/or bifunctional compound.

Resins produced as described above will be characterized in that (1) they will have at least about 1.5% nitrogen by weight incorporated therein, and more preferably from about 2.5% nitrogen to about 10% nitrogen; (2) they will have an absorption capacity for anions from about 1.3 milliequivalents/gram to about 3 milliequivalents/gram of resin; (3) they will have an anion absorption capacity of from about 0.5 milliequivalent/gram to about 1 milliequivalent/gram of resin; and (4) they will have acidic functional groups such as —COOH, —OSO$_2$H, and the like.

The invention may be further understood by reference to the specific examples described in detail below. The examples are meant to be illustrative only and the invention, of course, is not to be limited thereto. All percent

EXAMPLE 1

Reaction of pure dextrose with ammonia

Pure solid dextrose was dissolved in water to form a solution containing 85% dextrose. The dextrose solution was heated to a temperature of 115° C. with agitation.

A 25% solution of ammonia in water was added slowly to the hot dextrose solution. The pH of the solution was checked periodically to insure that it did not rise above neutral. This was done to insure that no carmelization would occur. The temperature of the solution throughout the addition of the ammonia solution was maintained at 100° C.±5° C. The reaction was stopped after 25.1% of ammonia, based on the dextrose, had been added. At this time, the dextrose had been converted into a completely jelled gummy mass.

The gummy mass was cooled to room temperature and suspended in water by vigorous agitation. The resulting suspension was filtered to remove soluble impurities. The resin was then dried in an oven. Analysis of the product showed that it contained 6.3% nitrogen and had significant acidic functionality. The cationic and anionic absorption capacities of the resin were determined. The resin would absorb 1.6 milliequivalent/gram of sodium, calcium, or barium; it would absorb 1 milliequivalent/gram of sulfate or 0.9 milliequivalent/gram of chloride.

The resin was effective as a carrier for antibiotics and, when in its salt form, as an agent for reducing stomach acidity.

EXAMPLE 2

Preparation of dextrose-amino acid resins

A dextrose solution was prepared as described in Example 1. The temperature of the solution during reaction with dextrose was maintained in the range from 108° C. to 115° C.

A 50% solution of glycine was added to the dextrose solution over a 10 minute period. The pH of the solution throughout the entire operation remained acidic. About 10% of glycine, based on the dextrose, was reacted with dextrose.

A gummy reaction mass was obtained which was cooled, dispersed in water, filtered, and washed as in Example 1. Analysis of the product showed that it contained approximately 2.7% nitrogen.

The anion and cation exchange capability of the resin was determined. The resin would absorb 2.3 milliequivalents/gram of sodium, 2.3 milliequivalents/gram of calcium or 2.5 milliequivalents/gram of barium. The resin would also absorb 0.5 milliequivalent/gram of sulfate or 0.3 milliequivalent/gram of chloride. The resin had significant acidic functionality.

Evaluation of the resin showed that it was effective when used as a carrier for antibiotics.

EXAMPLE 3

Preparation of resin from greens and ammonia

A greens (hydrol) solution containing 58% dextrose was demineralized and then reacted with ammonia by the procedure described in Example 1. The reaction took approximately 9 hours to complete.

The cationic absorption capacity of the resin for sodium, calcium, or barium was 1.3 milliequivalent/gram. The anionic absorption capacity of the resin for chloride or sulfate was .5 milliequivalent/gram. The nitrogen content of the resin was 3.6%. The resin had significant acidic functionality.

Evaluation of the sodium form of the resin as an agent to reduce stomach acidity showed that it was effective for this purpose.

EXAMPLE 4

Preparation of resins from dextrose and taurine

A dextrose solution was formulated exactly as in Example 1. The solution was reacted with the taurine (2-aminoethanesulfonic acid) with the taurine being added over a 6½ hour period. The taurine was added to the dextrose solution in comminuted form rather than as a solution as was the case in Examples 1–3. Approximately 5% of taurine, based on dextrose, was used. The resulting product had a nitrogen content of 4.2%.

The cation absorption capacity of the resin was 1.2 milliequivalent/gram for sodium or 1.4 milliequivalent/gram for calcium. Significant sulfonic acid functionality was introduced into the product.

The resin was evaluated both as a carrier for antibiotics such as neomycin and, when used in its sodium or calcium form, as an agent for reducing stomach acidity. It was effective for both uses.

Conclusion

The production of edible ion exchange resins by the method of the invention has been demonstrated by several examples. The resins produced are more effective in absorbing cations than in absorbing anions. They are suitable for use as carriers for antibiotics and, when in their salt forms as agents to reduce stomach acidity.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

That which is claimed is:

1. A process for producing an ion exchange resin having a cation absorption capacity of from about 1.3 to about 3 milliequivalents per gram which comprises:

providing an aqueous solution of a reducing sugar having at least about 70% dry substance dissolved therein at a temperature of from about 80° C. to about 150° C.;

adding an aqueous solution of a nitrogen compound selected from the group consisting of ammonia, protein hydrolysates, peptides, glycine, alanine, creptine, phenylalanine, lysine, tyrosine, taurine and mixtures thereof in an amount sufficient to provide a nitrogen content in the final product of from about 1.5 to about 10% by weight to the reducing sugar solution at a rate such that the pH of the aqueous solution of the reducing sugar is maintained below about 7, to form a gummy mass containing the resin;

dispersing the gummy mass in an aqueous liquid;

separating the mass from the liquid;

washing the separated mass; and recovering the nitrogen containing ion exchange resin.

2. The process of claim 1, wherein the reducing sugar is dextrose.

3. The process of claim 1, wherein the aqueous solution of a reducing sugar is a starch hydrolysate.

4. The process of claim 1, wherein the nitrogen compound is ammonia.

5. The process of claim 1, wherein the nitrogen compound is selected from the group consisting of glycine, alanine, creptine, phenylalanine, lysine and tyrosine.

6. The process of claim 1, wherein the nitrogen compound is taurine.

7. The process of claim 1, wherein the aqueous solution of a nitrogen compound is added in an amount sufficient to provide a nitrogen content in the final product of from about 2.5 to about 10% by weight.

8. An ion exchange resin having a nitrogen content of from about 1.5 to about 10% by weight and a cation absorption capacity of from about 1.3 to about 3 milliequivalents per gram, prepared by the process of claim 1.

References Cited
UNITED STATES PATENTS

| | | | |
|---|---|---|---|
| 2,808,401 | 10/1957 | Erickson | 260—211 |
| 2,875,194 | 2/1959 | Baker et al. | 260—211 |
| 2,884,411 | 4/1959 | Heyns | 260—211 |
| 3,100,203 | 8/1963 | Borchert | 260—211 |
| 3,133,912 | 5/1964 | Kimmig et al. | 260—211.5 |
| 3,278,518 | 10/1966 | Schramm et al. | 260—211.5 |
| 3,447,917 | 6/1969 | Davis et al. | 260—211.5 |
| 3,541,079 | 11/1970 | Schramm et al. | 260—211.5 |
| 3,546,171 | 12/1970 | Fujimoto et al. | 260—211 |
| 3,549,616 | 12/1970 | Acton et al. | 260—211 |

LEWIS GOTTS, Primary Examiner

J. R. BROWN, Assistant Examiner

U.S. Cl. X.R.

260—2.2 R, 78 A, 112 R, 112.5, 211.5 R; 424—180